(12) United States Patent
Schwartz et al.

(10) Patent No.: US 6,581,457 B2
(45) Date of Patent: Jun. 24, 2003

(54) COMPOUND FLUID METER WITH FLOW DISTRIBUTOR

(75) Inventors: Dennis W. Schwartz, West Bend, WI (US); George De Jarlais, Wauwatosa, WI (US); Christopher G. Kocher, Belleville, IL (US); Mario P. Gomez, Ladue, MO (US); Ildefonso Gonzalez Artigas, St. Charles, MO (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/881,618

(22) Filed: Jun. 14, 2001

(65) Prior Publication Data

US 2002/0189341 A1 Dec. 19, 2002

(51) Int. Cl.[7] .............................................. G01F 7/00
(52) U.S. Cl. ...................................................... 73/197
(58) Field of Search .......................... 73/197, 198, 196, 73/195, 861.75–861.79, 236–238

(56) References Cited

U.S. PATENT DOCUMENTS

| | | | |
|---|---|---|---|
| 3,248,583 A | | 4/1966 | Kullmann |
| 3,972,233 A | | 8/1976 | Pelt et al. |
| 4,100,799 A | | 7/1978 | Bradham, III et al. |
| 4,100,800 A | * | 7/1978 | Pelt .............................. 73/197 |
| 4,131,017 A | * | 12/1978 | Back ........................ 73/861.79 |
| 4,144,883 A | * | 3/1979 | Grieshaber ............... 73/861.79 |
| 4,175,434 A | * | 11/1979 | Bradham, III et al. ......... 73/197 |
| 4,217,929 A | | 8/1980 | Pelt |
| 4,429,571 A | | 2/1984 | Kullmann et al. |
| 4,437,344 A | | 3/1984 | Karjalainen |
| 4,512,201 A | * | 4/1985 | Konrad et al. ............ 73/861.79 |
| 4,746,808 A | * | 5/1988 | Kaeser ..................... 73/861.79 |
| 5,085,076 A | | 2/1992 | Engelmann |
| 5,136,882 A | * | 8/1992 | Wada .......................... 73/198 |
| 5,596,152 A | * | 1/1997 | Bergervoet et al. ...... 73/861.79 |
| 5,713,240 A | | 2/1998 | Engelmann |
| 6,079,281 A | * | 6/2000 | Oszajca et al. .......... 73/861.79 |
| 6,138,519 A | * | 10/2000 | Bergervoet et al. ...... 73/861.79 |

* cited by examiner

*Primary Examiner*—Hezron Williams
*Assistant Examiner*—Charlene Dickens
(74) *Attorney, Agent, or Firm*—Quarles & Brady LLP

(57) ABSTRACT

A compound meter assembly (10) has a housing (15, 17, 19), a high volume flow meter (14) disposed in a main flow passageway (22) for detecting a flow rate of relatively higher volume flows and a low volume flow meter (12) disposed in the secondary flow passageway (29) for detecting a flow rate of relatively lower volume flows. A flow distributor (70) is disposed in the inlet and disposed adjacent the entrance (27) into the secondary flow passageway from the main passageway, said flow distributor (70) having a central opening (71) for receiving the main flow and having flow ports (72) disposed around its circumference for allowing portions of the main flow to flow towards interior walls (26) of the housing (15, 17, 19) such that the flow is better distributed across a cross section of the main passageway (22) to maintain the accuracy of the meter at a crossover region (61, 62) between low flows being metered by the low volume flow meter (12) and high flows being metered by the high volume flow meter (14).

20 Claims, 7 Drawing Sheets

COMPOUND FLUID METER WITH FLOW DISTRIBUTOR

TECHNICAL FIELD

The invention relates to fluid meters for measuring variable flow rates in a pipe using a high volume flow meter and a low volume flow meter, which together form what is referred to in the technical field as a "compound flow meter."

DESCRIPTION OF THE BACKGROUND ART

Examples of prior compound flow meters are seen in Bradham III, et al. U.S. Pat. No. 4,100,799, Pelt, U.S. Pat. No. 4,217,929, Kullmann et al., U.S. Pat. No. 4,429,571 and Karjalainefl, U.S. Pat. No. 4,437,344.

In a compound flow meter, a secondary flow passageway is typically provided for a low volume flow. This secondary flow passageway connects the primary flow passageway to a chamber in which a low volume flow meter, such as a nutating disc type meter, is situated to measure flow in the low flow range. A meter register is mechanically or magnetically coupled to the flow responsive element in the low volume flow meter to provide a readout of the flow rate in cubic feet, gallons, cubic meters, imperial gallons or other units. A pressure-responsive valve is situated in the main flow passageway, and when the flow exceeds a predetermined threshold, it forces open the valve door and the flow moves through the remaining portion of the main flow passageway in which a high volume flow meter, such as a turbine meter, is positioned. The flow responsive element of the high volume flow meter is also coupled to a meter register. When the flow drops to a certain level, which may be lower than the flow that was required to open the main valve, the main valve closes as a result of a return mechanism, and the flow is limited to the secondary flow passageway.

Various compound meters have been known in the art for measuring variable flow rates within a piping system. Such assemblies should accurately measure the flow rate over a wide range, while providing durability, reliability and a reasonable cost of manufacture. In particular, the meter should be accurate to within –5% or +3% accuracy in all operations, including the range of operation where the meter switches primarily from measuring low flow to measuring high flow. This area of switching is known as the "crossover region."

In a compound meter of the prior art disclosed in Bradham, III et al., U.S. Pat. No. 4,100,799, a pivoting flap mechanism was used in the secondary flow passageway. During low flow, the flap would remain open. As flow increased, the flap closed and caused a pressure to build up which opened the valve in the primary passageway, after which the flap again opened to permit flow through the secondary passageway as well as through the main passageway at high flow rates.

It has been a technical goal to design an improved compound meter which is capable of economical manufacture in suitable quantities, and which does not require the flap mechanism. In test equipment, which did not use the flap, turbulent and uneven flow was encountered in the region where the secondary passageway exited the main flow passageway. This uneven flow produced inaccuracy outside of acceptable standards. In order to overcome this phenomenon, the present invention was made.

SUMMARY OF THE INVENTION

The invention is provided in a compound meter assembly in which a flow distributor is placed in the main passageway near a housing inlet and adjacent to the entrance to the secondary flow passageway from the main passageway. The flow distributor has a central opening for receiving the main flow and flow ports disposed around at least a portion of its circumference for allowing distributed portions of the main flow to flow towards interior walls of the housing such that the flow is better distributed across a cross section of the main passageway to maintain the accuracy of the meter at a crossover region between low flows being metered by the low volume flow meter and high flows being metered by the high volume flow meter.

In a preferred embodiment the flow distributor is provided by a ring-shaped member with equally sized apertures equally spaced around its circumference, however, it should be understood that other types of flow distributors are within the scope and spirit of the present invention.

In a preferred embodiment the housing is an integrally formed casting which contains the main passageway and includes an integrally formed side pipe that encloses a portion of the secondary passageway.

In a preferred embodiment, the high volume flow meter is of the turbine type, while the low volume flow meter is of the nutating disc type, however it should be understood that other types of metering elements could be used while still coming within the broadest scope of the present invention.

With the present invention, the compound meter will maintain accuracy to within a range between +3% and –5% of actual flow rate even in the crossover region where the main valve is opening and primary metering is being switched from the low volume flow meter to the high volume flow meter. The meter also retains this accuracy when switching back from primary metering by the high volume flow meter to the low volume flow meter.

It is a further specific object of the invention to provide an improved simplified main valve configuration, such that the internal parts inside the meter housing have greater life, durability and reliability.

In particular, the valve is provided as a subassembly which conveniently screws into the meter housing.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 4a is a perspective view of a main valve subassembly seen in FIG. 2;

FIG. 4b is an exploded perspective view of the main valve subassembly of FIG. 4a;

FIG. 6b is a transverse sectional view taken in the same plane as FIG. 6a.

DETAILED DESCRIPTION OF THE PREFERRED EMBODIMENT

Figure 1:
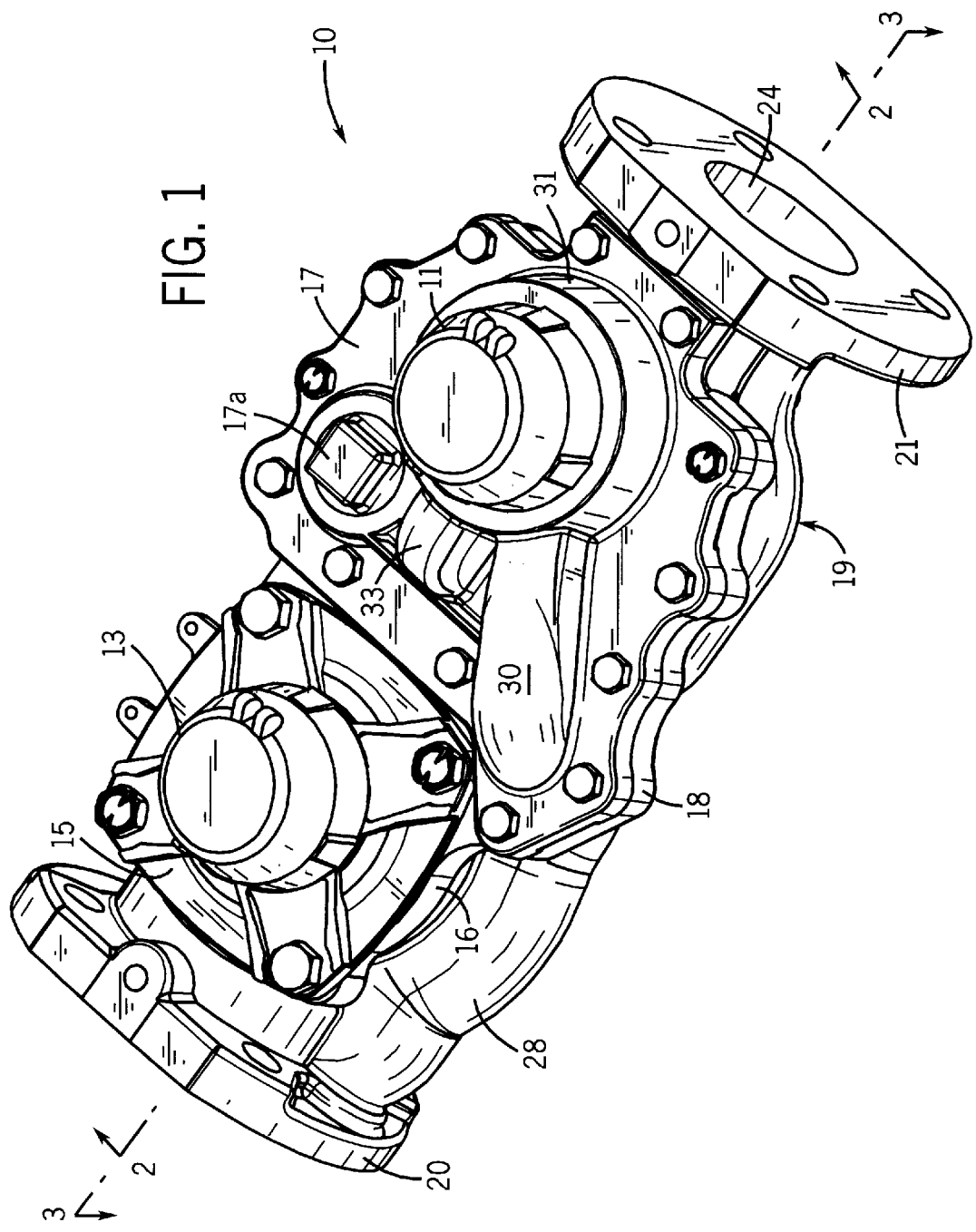
FIG. 1 is a perspective view of a compound meter that incorporates the present invention.
Figure 2:
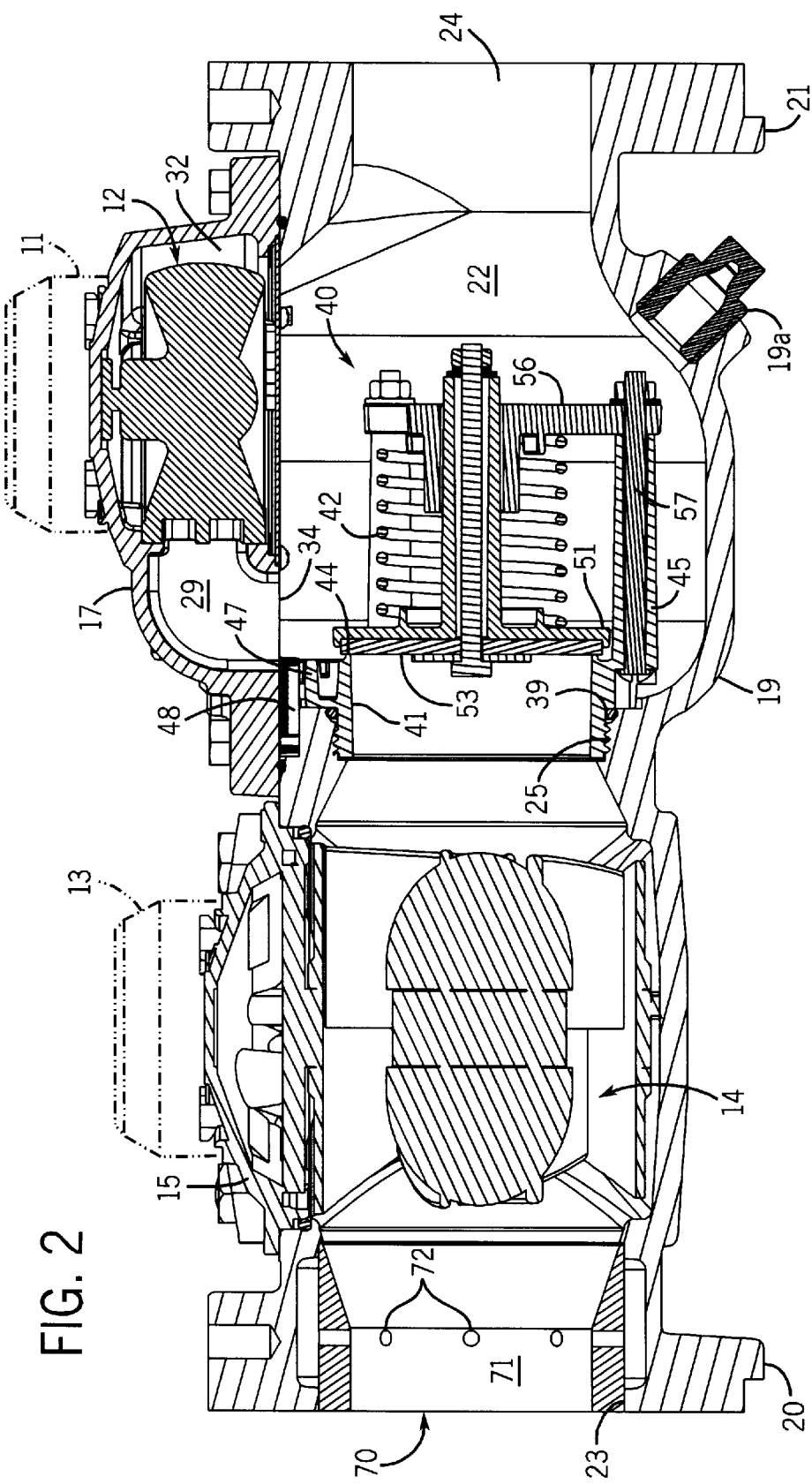
FIG. 2 is a longitudinal vertical section view taken in the plane indicated by line 2—2 in FIG. 1.

Referring to FIG. 1, an exterior of a compound flow meter assembly 10 that incorporates the present invention is shown. The compound flow meter assembly 10 has a first meter register 11 (FIG. 1) for a low flow meter 12 (FIG. 2) and a second meter register 13 (FIG. 1) for the high flow, turbine type meter 14 (FIG. 2).

The meter registers 11 and 13 (FIG. 1) are magnetically coupled to the movements of the low flow meter and the high flow meter, respectively. The meter registers 11, 13, typically include respective housings of synthetic material including a register housing cover, which covers a crystal and a dial face with a numerical display of an accumulated count of fluid flow and consumption.

The low flow meter 12 (FIG. 2) is mounted under a housing cover 17 (FIG. 1) which is bolted onto the main housing body 19. A threaded access plug 17a with a square head is inserted into a threaded bore in the housing cover 17. This plug 17a can be removed for access to the interior of the housing body 19 to perform accuracy tests when the meter 10 is connected in a piping system.

The low flow meter 12 (FIG. 2) is of a suitable nutating disc type, of which one example is disclosed in U.S. Pat. No. 3,248,583. This type of flow meter operates by positive displacement, and is thus particularly suitable for accurately measuring low rates of liquid flow (e.g., less 15 g.p.m.). The nutating movement is transformed into rotary movement through a drive spindle (not shown) connected to the disc. The rotary movement is then transmitted through a magnetic coupling to the register 11 (FIG. 1).

The high flow, turbine-type meter 14 is also of a type well known in the art. It is suspended from a smaller housing cover 15 seen in FIG. 1, which mounts on top of a mounting flange 16. As used herein, the term "housing" shall mean the assembly of housing body 19, mounting flange 17 and mounting flange 16. This high flow meter is particularly well suited for accurately measuring high flow rates (e.g., above 15 g.p.m.). This meter is of a suitable axial flow turbine type, of which one example is disclosed in U.S. Pat. No. 3,972,233. Such a meter includes a turbine wheel or impeller supported within a main flow passageway 22 seen in FIG. 2. The rotational movement of the impeller is transmitted to an upright elongated shaft and a suitable magnetic coupling to the meter register 13 seen in FIG. 1.

A main valve assembly 40 of the present invention (FIGS. 2, 4a) has a threaded cylindrical flange 41 which is screwed into a threaded bore 25 (FIG. 2) in the main housing body 19 (FIG. 2). An O-ring sealing ring 39 of resilient synthetic material is disposed around the threaded flange 41 to seal the threaded coupling 41, 25 (see FIG. 2) against leakage flow when the main valve assembly 40 is closed.

Figure 5:
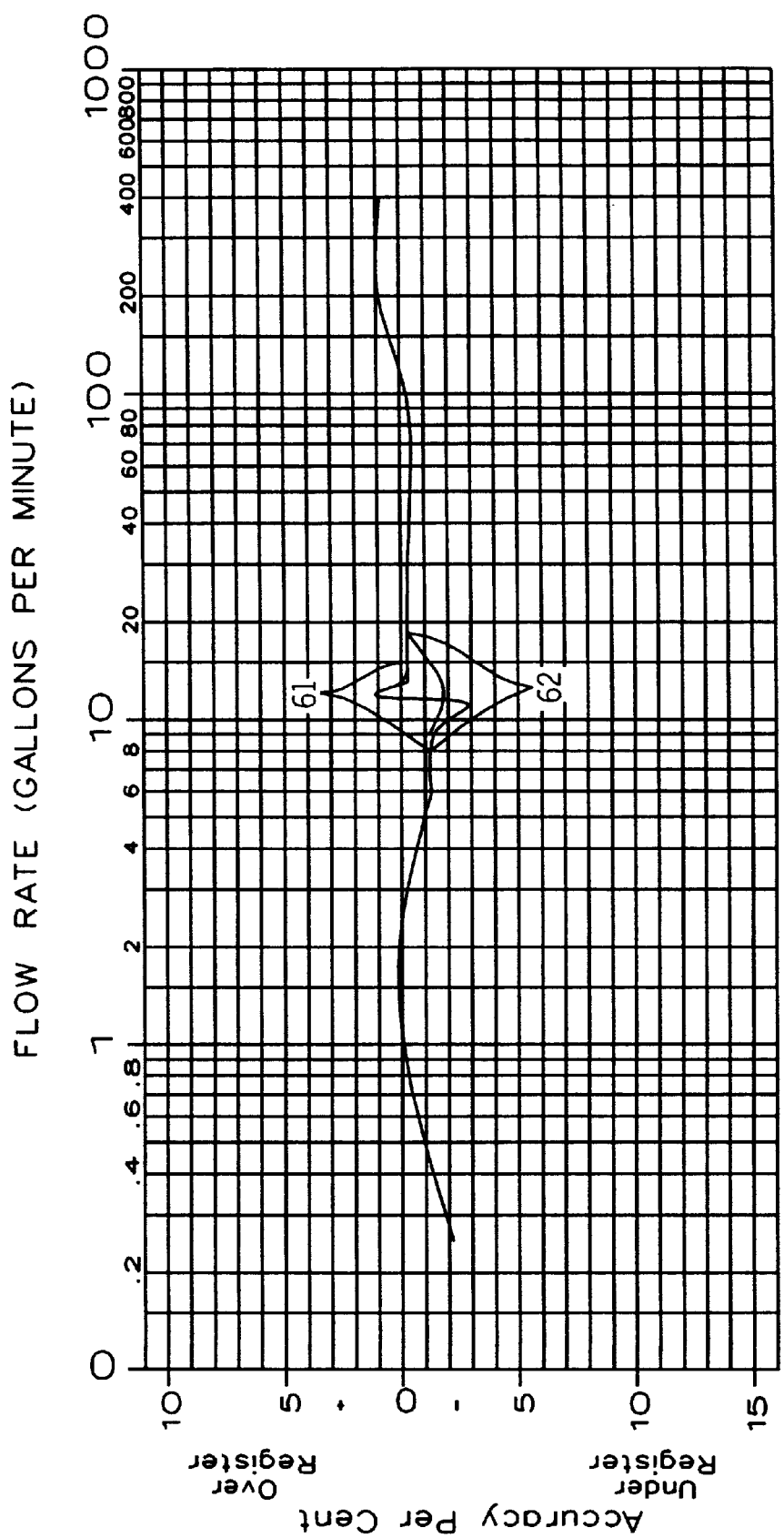
FIG. 5 is a graph of the accuracy of the meter vs. flow rate.

The main valve assembly 40 is characterized as a "poppet-type" valve which will unseat and open in response to a flow impulse. A large coiled compression spring 42 is compressed when a valve door subassembly is moved off of a valve seat 44 formed on a valve mount 45. When flow in the main passageway 22 drops below a certain threshold, as shown in FIG. 5, the stored force and potential energy in the compression spring 42 will return the valve door 51, 53 to its closed position on the valve seat 44.

The valve mount 45 is a complex molded part which includes the threaded, annular flange 41 and a toothed peripheral rim 47 extending around its outer periphery. A pawl 48 on the underside of the housing cover 17 (FIG. 2) is received between two of the teeth 50 of the rim 47 to secure the valve mount 45 in its proper orientation and to secure it against rotating loose from its threaded engagement with the housing bore 25.

Figure 4:
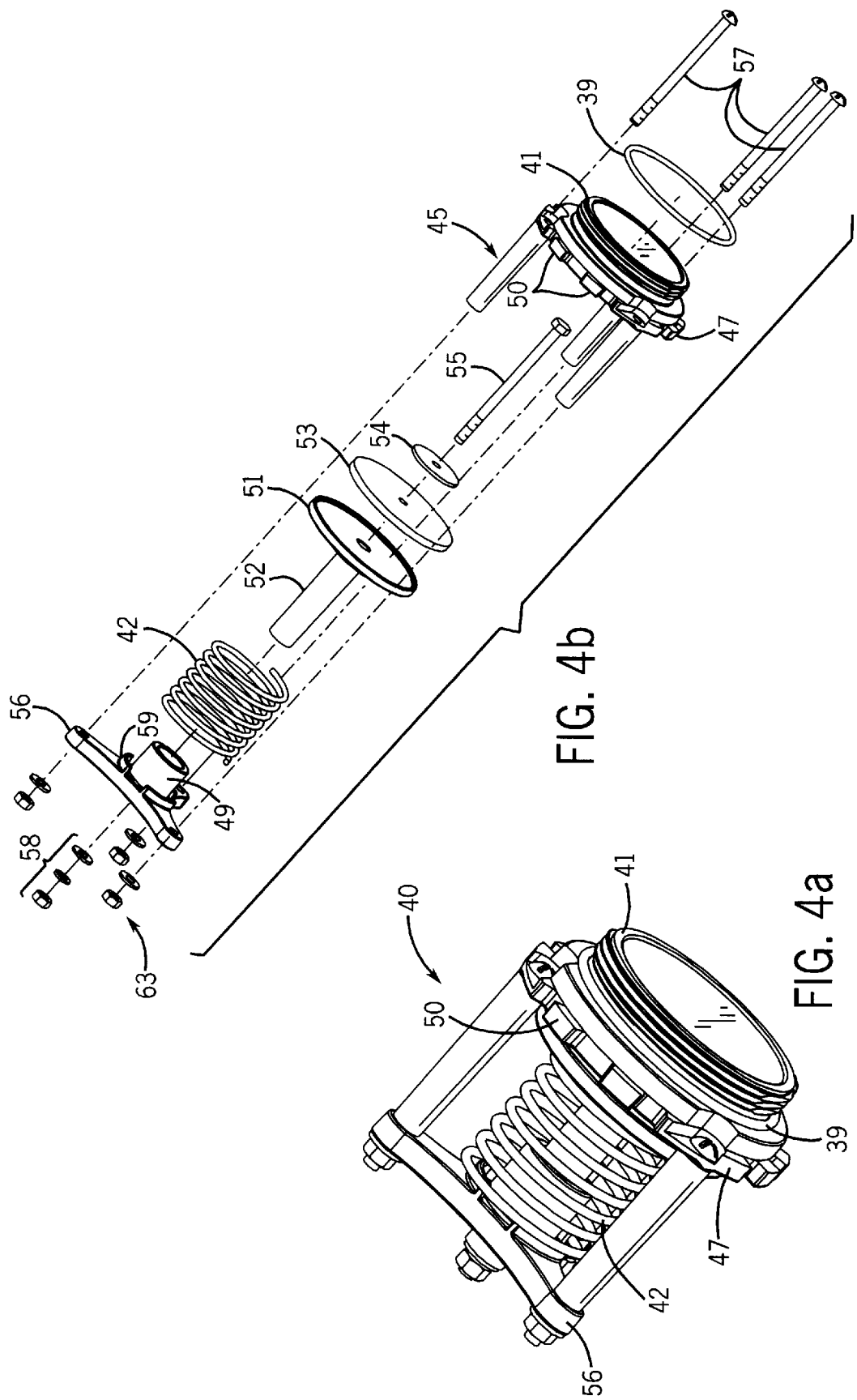

As best understood from viewing FIG. 2 together with FIG. 4b, the valve door subassembly includes a cylindrical disk-shaped member 51 with an extension tube 52 extending to a rear element 56 and with a cylindrical door seal 53 of resilient synthetic material on the front for engaging valve seat 44. The disc-shaped door seal 53 of resilient synthetic material is held in place by retaining washer 54 and a bolt 55 which extends through elements 51, 52, 53 and 54 and is secured by lock nut and washer combination 58 to a three-legged spider element 56 for retaining the main return spring 42 in the main valve assembly 40. The spider element 56 forms actuate ridges 59 for seating one end of the spring 42. The spider element also forms a cylindrical hub flange 49 for receiving one end of the standoff tube 52. In addition to the central bolt 55, there are three assembly bolts 57 extending through molded hollow tubular legs 58 of the valve mount 44 and through holes in the spring retaining spider element 56, where they secured by conventional washer-nut combinations 63.

The meter housing body 19 (see FIGS. 1, 2) is formed by a casting and includes integral flanges 20, 21 (FIG. 1) at opposite ends for connecting the compound flow meter assembly 10 in a piping system (not shown), and for measuring the variable liquid flow through the piping system. A drain plug 19a (FIG. 2) is removable from a port in the bottom of the housing body 19 for draining fluid from the housing.

Figure 3:
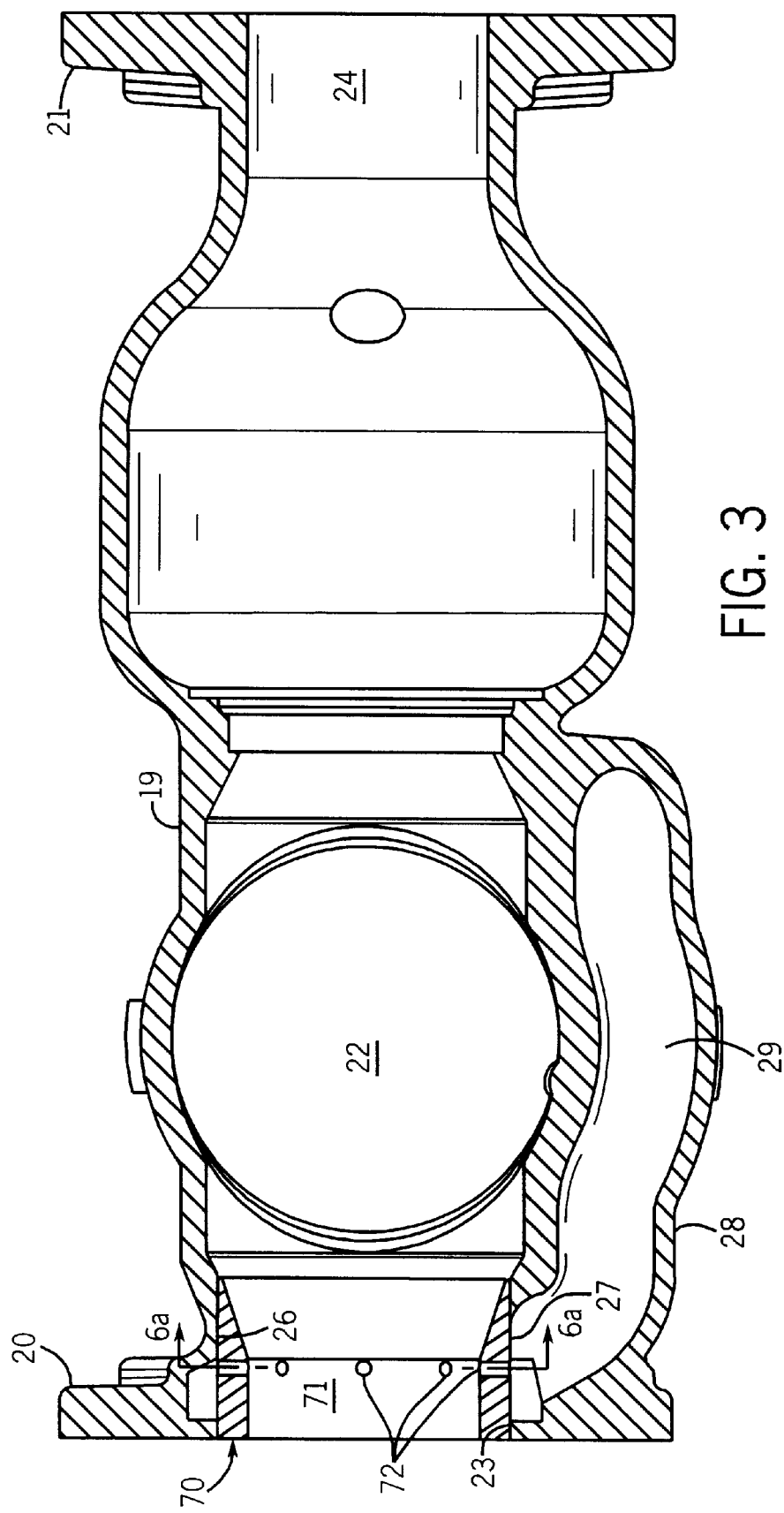
FIG. 3 is a longitudinal horizontal section view.

FIG. 3 shows the interior of the housing body 19, where a main flow passageway 22 extends through the body 19 from a main inlet 23 in a mounting flange 20 at one end to a main outlet 24 in the mounting flange 21 at the other end. A secondary flow passageway inlet 27 exits from the main flow passageway 22 near the inlet end of the body 19 and enters a tubular portion 28 (FIG. 1) integrally formed along one side of the housing body 19. This tubular portion 28 extends along the side of the housing body 19 to the area of the flange 18 supporting the large cover 17, where the tubular portion turns upwardly and extends up to the underside of the flange 18. A portion of the secondary flow passageway 29 is formed by the tubular portion 28. Although the tubular portion 28 terminates at the flange 18, the secondary flow passageway 29 continues through the flange 18 into the larger housing cover 17 and through a first duct 30 leading to a generally cylindrical portion 31 of the cover 19 with a chamber 32 in which the nutating disc meter 12 is contained. A second duct 33 (FIG. 1) is disposed approximately 45° around the cylindrical portion 31 from the first duct 30, and houses a portion of the secondary flow passageway 29 which leads out of the nutating disc meter chamber 32. The secondary flow passageway 29 turns downward extending through the bottom of the cover 17 and the mounting flange 18 to re-enter into the main flow passageway 22 at a re-entry entrance 34.

Figure 6A:
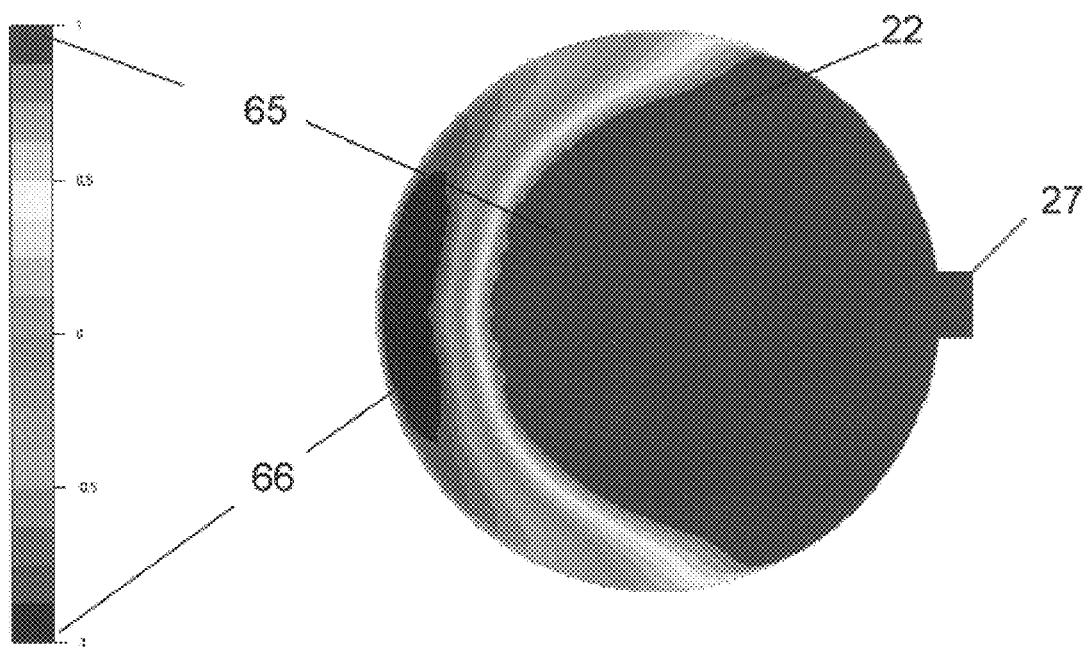
FIG. 6a is a transverse sectional view taken in the plane indicated by line 6a—6a in FIG. 3.

During development of this compound meter, an error in meter readings was observed, particularly at the crossover from operation of the low flow meter to the high flow meter (the crossover region). This is typical in compound meters. Computer-aided flow studies were conducted and it was determined that flow was turbulent and uneven in the region of the main passageway 22 of a test apparatus near the entrance 27 to the secondary passageway. This is illustrated by the flow cross section shown in FIG. 6a. Flow velocity was much higher in the region 65 adjacent the entrance 27 of the secondary passageway, than in region 66 on the other side of the main passageway 22. This produced turbulence near the entrance to the secondary passageway, which in turn lead to inaccuracies in readings in the crossover region.

As a result, a flow distributor 70 was introduced and positioned near the housing inlet. The flow distributor 70 is preferably a ring-shaped member disposed adjacent the entrance 27 into the secondary flow passageway 29 from the main passageway 22. The flow distributor 70 has a central opening 71 for receiving the main flow and has flow ports 72 disposed around its circumference for allowing portions of the main flow to flow towards interior walls 26 (seen best in FIG. 6b) of the main housing body. In this example, the ports 72 are of equal size and are equally spaced around the ring-shaped member. It is feasible that in certain embodiments, the ports can be of unequal size and of unequal spacing. Also, in the embodiment shown in FIGS. 2 and 3, the flow distributor central opening 71 has a portion which flares outwardly from a narrower diameter cross section facing the inlet 23 to a wider diameter cross section facing away from the inlet 23. This is due to the matching of the turbine meter 14 to the capacity of the compound meter assembly 10. In other embodiments, the central opening is of constant diameter and there is no flared portion.

Figure 6B:
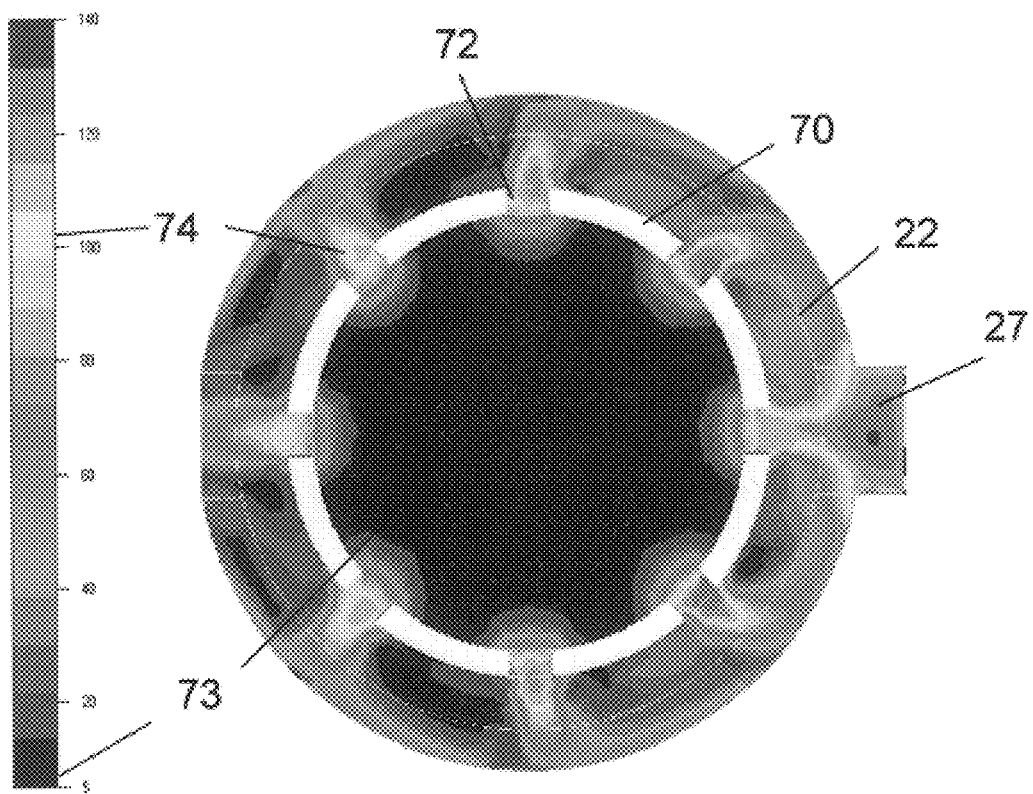

With this distributor 70, the flow is better distributed across a cross section of the main passageway as illustrated in FIG. 6b. Low flow 73 is observed in the main passageway, while higher flow 74 is localized around the ports 72, thereby reducing turbulence at secondary passageway entrance 27.

As further illustrated in FIG. 5, this maintains the accuracy of the meter 10 in the crossover region 61, 62 between low flows being metered by the low volume flow meter 12 and high flows being metered by the high volume flow meter 14. The main valve assembly 40 begins to open in the increasing crossover region 61 between 10 g.p.m. (gallons per minute) and 15 g.p.m. in the main flow passageway 22. At fifteen g.p.m. the door is sufficiently open for stabilized flow and accuracy. After opening, the door 51, 53 will maintain its open position until the flow in the main flow passageway decreases to a decreasing flow crossover region 62 of metering operations, which in this example is 15 g.p.m. (gallons per minute). This creates a crossover region 62 down to about 10 g.p.m. where the main valve 40 is closed and flow has stabilized through the secondary passageway 29.

As seen in FIG. 5, in both directions through the crossover region 61, 62, the region with the largest error, is less than +3% or −3%. This is measured by independently measuring the volume of flow through the meter in a given time interval and comparing it to the readings on the meter registers 11, 13.

The above-described construction also provides an improved meter configuration, such that the parts inside the main passageway and secondary passageway have improved life, durability and reliability.

This has been a description of examples of how the invention can be carried out. Those of ordinary skill in the art will recognize that various details may be modified in arriving at other detailed embodiments, and these embodiments will come within the scope of the invention.

We claim:

1. A compound meter assembly for measuring flow within suitable standards of accuracy, said assembly comprising:
    a housing having an inlet, an outlet and a main flow passageway extending between the inlet and the outlet of the housing for carrying a relatively higher volume flow;
    the housing also forming at least a portion of a secondary flow passageway for carrying a relatively lower volume flow than the main passageway, said secondary flow passageway having an entrance from the main flow passageway and an exit re-entering the main flow passageway;
    a high volume flow meter disposed in the main flow passageway for detecting a flow rate of relatively higher volume flows;
    a low volume flow meter disposed in the secondary flow passageway for detecting a flow rate of relatively lower volume flows; and
    a flow distributor disposed in the inlet and disposed adjacent to the entrance to the secondary flow passageway, said flow distributor having a central opening for receiving the main flow arid having flow ports disposed around at least a portion of a circumference of said flow distributor for allowing portions of the main flow to flow towards interior walls of the housing such that the flow is better distributed across a cross section of the main passageway to maintain the accuracy of the meter at a crossover region between low flows being metered by the low volume flow meter and high flows being metered by the high volume flow meter.

2. The compound meter assembly of claim 1, wherein the flow distributor central opening has a portion which flares outwardly from a narrower diameter cross section facing the inlet to a wider diameter cross section facing away from the inlet.

3. The compound meter assembly of claim 1, wherein the housing includes an integral housing body which forms both the main passageway and a portion of the secondary passageway.

4. The compound meter assembly of claim 3, wherein the housing body has an integrally formed side pipe that forms a portion of the secondary passageway.

5. The compound meter assembly of claim 1, wherein the high volume flow meter is a turbine-type flow meter.

6. The compound meter assembly of claim 1, wherein the low volume flow meter is a nutating disc-type flow meter.

7. The compound meter assembly of claim 1, further comprising a main valve assembly disposed in the main passageway downstream of the entrance to the secondary passageway, said main valve assembly being responsive to a predetermined opening pressure caused by an increase in flow to open and allow flow through the main passageway, said main valve assembly being further responsive to a predetermined decreasing flow threshold to close and interrupt flow through the main passageway.

8. The compound meter assembly of claim 7, wherein said main valve assembly includes an annular flange with a thread that engages a threaded bore in the housing.

9. The compound meter assembly of claim 8, wherein said housing has a pawl for securing the valve assembly in place in the bore in the housing.

10. The compound meter assembly of claim 1, wherein the flow distributor is annular with a plurality of ports of equal size spaced equally around the circumference of the flow distributor.

11. A compound meter assembly comprising:
    a housing having an inlet, an outlet and a main flow passageway disposed between the inlet and the outlet of the housing for carrying a relatively higher volume flow;
    a secondary flow passageway for carrying a relatively lower flow than the main passageway, said secondary flow passageway having an entrance communicating with the main flow passageway and an exit communicating with the main flow passageway;

a high volume flow meter disposed in the main flow passageway for detecting a flow rate of relatively higher volume flows;

a low volume flow meter disposed in the secondary flow passageway for detecting a flow rate of relatively lower volume flows; and a flow distributor disposed in the inlet and disposed adjacent to the entrance to the secondary flow passageway, said flow distributor having a central opening for receiving the main flow and having flow ports disposed around at least a portion of a circumference of said flow distributor for allowing portions of the main flow to flow towards an interior of the housing such that the flow is more evenly distributed across a cross section of the main passageway to maintain accuracy of the meter during operation through a crossover region between low flows being metered by the low volume flow meter and high flows being metered by the high volume flow meter.

12. The compound meter assembly of claim 11, wherein the central opening of the flow distributor has a portion which flares outwardly from a narrower diameter cross section facing the inlet to a wider diameter cross section facing away from the inlet.

13. The compound meter assembly of claim 11, wherein the housing includes an integral housing body which forms both the main passageway and a portion of the secondary passageway.

14. The compound meter assembly of claim 13, wherein the housing body has an integrally formed side pipe that forms a portion of the secondary passageway.

15. The compound meter assembly of claim 11, wherein the high volume flow meter is a turbine-type flow meter.

16. The compound meter assembly of claim 11, wherein the low volume flow meter is a nutating disc-type flow meter.

17. The compound meter assembly of claim 11, further comprising a main valve assembly disposed in the main passageway downstream of the entrance to the secondary passageway, said main valve assembly being responsive to a predetermined opening pressure caused by an increase in flow to open and allow flow through the main passageway, said main valve assembly being further responsive to a predetermined decreasing flow threshold to close and interrupt flow through the main passageway.

18. The compound meter assembly of claim 17, wherein said main valve assembly includes a ring-shaped flange with a thread that engages a threaded bore in the housing.

19. The compound meter assembly of claim 18, wherein said housing has a mechanism for securing the valve assembly in place in the bore in the housing.

20. The compound meter assembly of claim 11, wherein the flow distributor is ring-shaped with a plurality of ports of equal size spaced equally around the circumference of the flow distributor.

* * * * *

UNITED STATES PATENT AND TRADEMARK OFFICE
CERTIFICATE OF CORRECTION

PATENT NO.    : 6,581,457 B2
DATED         : June 24, 2003
INVENTOR(S)   : Schwartz et al.

It is certified that error appears in the above-identified patent and that said Letters Patent is hereby corrected as shown below:

Column 1,
Line 14, "Karjalainefl" should be -- Karjalainen --.

Column 6,
Line 16, "arid" should be -- and --.

Signed and Sealed this

Eleventh Day of November, 2003

JAMES E. ROGAN
*Director of the United States Patent and Trademark Office*